(12) United States Patent
Shafique et al.

(10) Patent No.: US 11,261,793 B2
(45) Date of Patent: Mar. 1, 2022

(54) ENGINE FUEL SYSTEM FOR USE WITH COMPOSITE AIRCRAFT

(71) Applicant: PRATT & WHITNEY CANADA CORP., Longueuil (CA)

(72) Inventors: Harris Shafique, Longueuil (CA); David Waddleton, Candiac (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 225 days.

(21) Appl. No.: 16/587,686

(22) Filed: Sep. 30, 2019

(65) Prior Publication Data

US 2020/0141322 A1 May 7, 2020

Related U.S. Application Data

(62) Division of application No. 14/974,010, filed on Dec. 18, 2015, now Pat. No. 10,465,609.

(51) Int. Cl.
| | |
|---|---|
| *F02C 7/22* | (2006.01) |
| *F02C 9/36* | (2006.01) |
| *B64D 37/10* | (2006.01) |
| *F02C 7/236* | (2006.01) |
| *F02C 7/224* | (2006.01) |

(52) U.S. Cl.
CPC .............. *F02C 7/236* (2013.01); *B64D 37/10* (2013.01); *F02C 7/224* (2013.01); *F02C 9/36* (2013.01); *Y02T 50/60* (2013.01)

(58) Field of Classification Search
CPC .. F02C 7/22; F02C 7/224; F02C 7/236; F02C 9/36; F02C 9/38; F23R 3/28; B64D 37/30; B64D 37/34; B64D 37/10
See application file for complete search history.

(56) References Cited

U.S. PATENT DOCUMENTS

| | | | |
|---|---|---|---|
| 4,877,377 A | 10/1989 | Taylor | |
| 5,904,845 A | 5/1999 | Girondi | |
| 8,221,633 B2 | 7/2012 | Lam | |
| 8,440,083 B2* | 5/2013 | Jiang | F02M 37/34 210/338 |
| 2005/0279079 A1* | 12/2005 | Baryshnikov | F02C 7/236 60/39.094 |
| 2013/0036738 A1* | 2/2013 | Pora | F02M 37/025 60/734 |
| 2014/0251889 A1 | 9/2014 | LaForge | |
| 2016/0281656 A1 | 9/2016 | Alecu et al. | |

* cited by examiner

*Primary Examiner* — Andrew H Nguyen
(74) *Attorney, Agent, or Firm* — Norton Rose Fulbright Canada LLP

(57) ABSTRACT

A method of pumping fuel in a fuel system of a composite aircraft having a gas turbine engine includes feeding unheated fuel from a fuel tank to the gas turbine engine, by using an ejector pump to draw the fuel from the fuel tank and feeding the fuel through an engine fuel pump within a main fuel line upstream of the gas turbine engine. Fuel from the main fuel line is bled and directed to the ejector pump via a motive flow pump assembly, the motive flow pump assembly including a motive flow pump generating a motive flow for the ejector pump. The bleed fuel flow is then passed through a hydrophobic fuel screen located upstream of the motive flow pump.

9 Claims, 4 Drawing Sheets

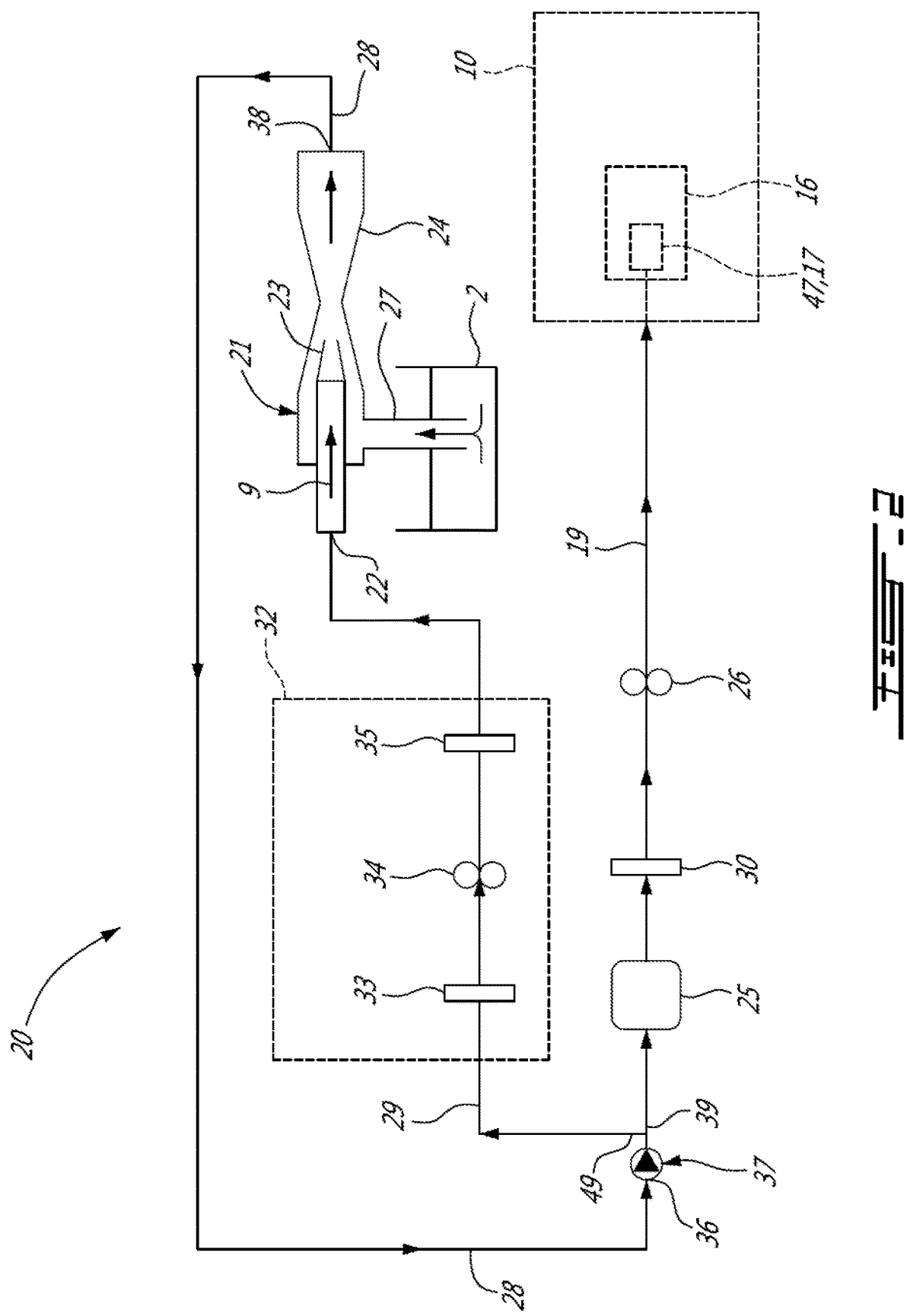

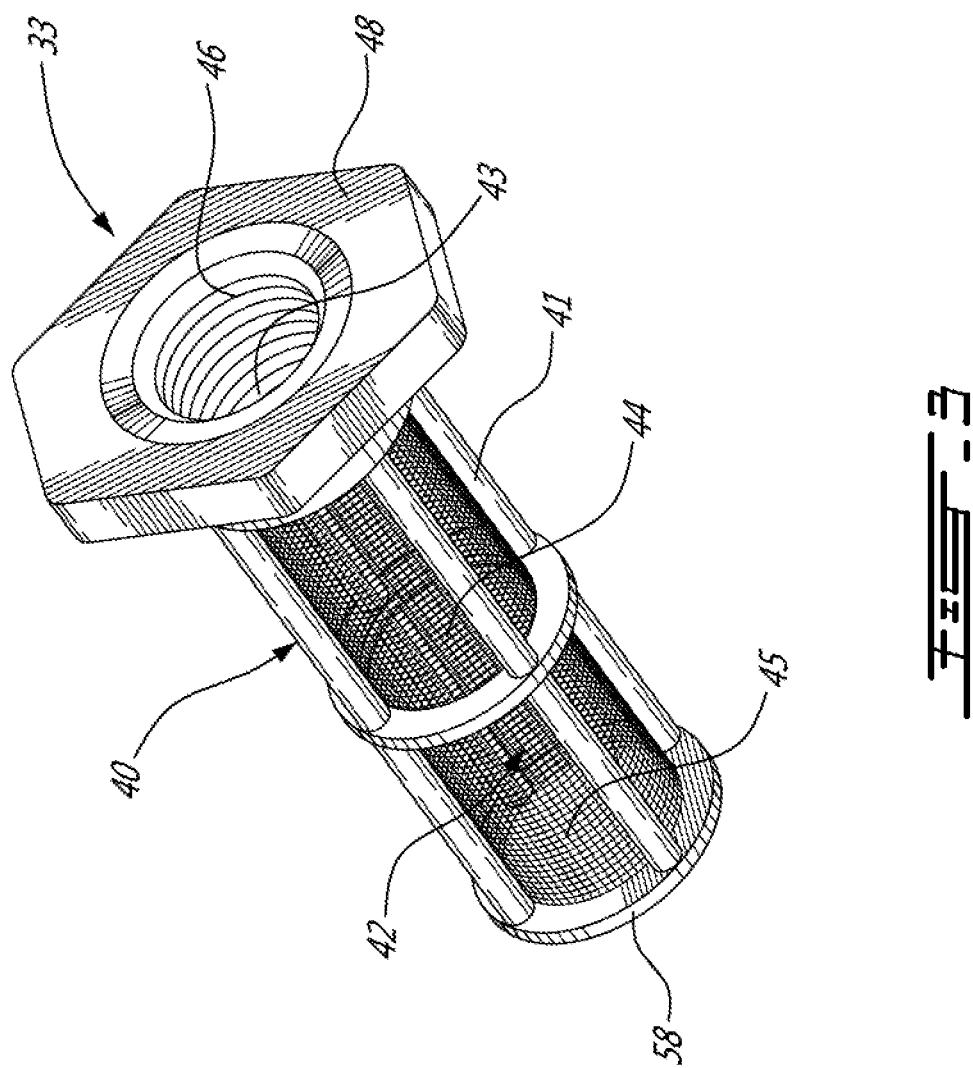

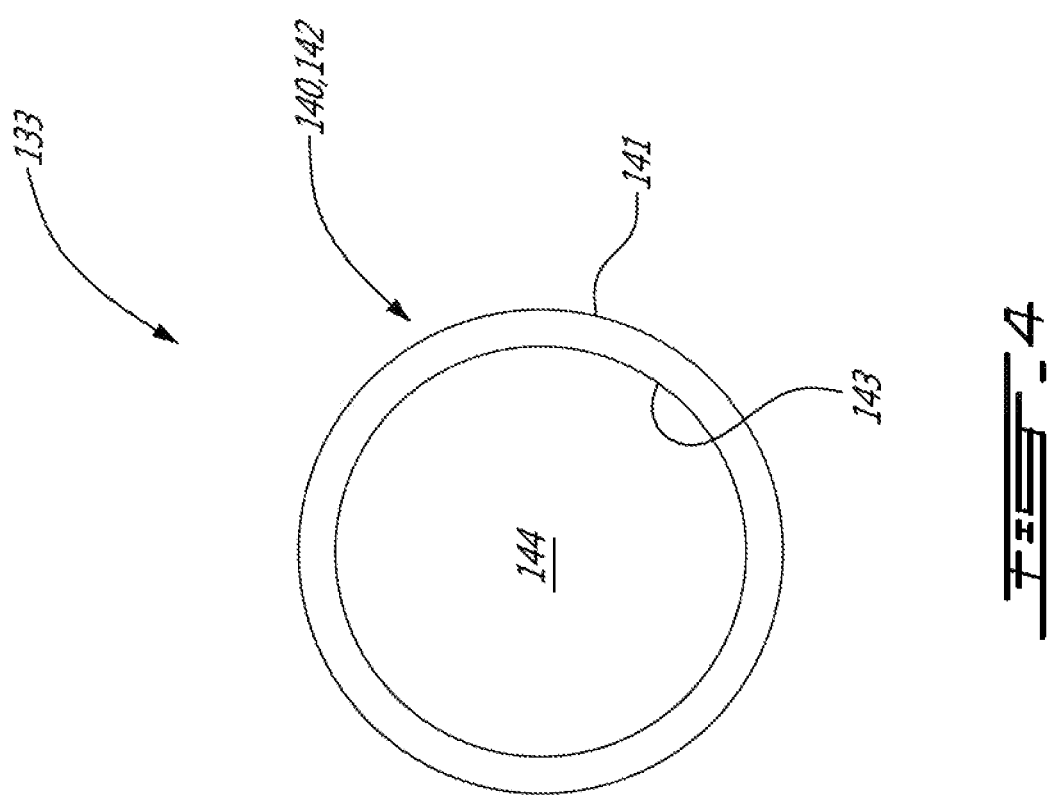

ENGINE FUEL SYSTEM FOR USE WITH COMPOSITE AIRCRAFT

CROSS-REFERENCE TO RELATED APPLICATIONS

The present application is a divisional of U.S. patent application Ser. No. 14/974,010 filed Dec. 18, 2015, the entire content of which is incorporated herein by reference.

TECHNICAL FIELD

The present disclosure relates generally to gas turbine engine fuel systems, and more particularly to a motive flow fuel system.

BACKGROUND

Known fuel systems for aircraft gas turbine engines include motive flow systems which use motive flow ejector pumps to draw fuel from fuel tanks for delivery to the engines. In aircraft applications where fuel tanks are often located in the wing, however, the fuel drawn out of the wing fuel tanks and directed towards the engines by such motive flow fuel systems is often cold. As a result, ice crystals caused by frozen water droplets produced by condensation created when the fuel is exposed to low temperatures are prone to forming in the cold fuel.

To prevent this from occurring, hot motive fuel systems are often used, wherein the high pressure motive fuel flow used to drive a motive flow ejector pump is bled downstream from an engine fuel/oil heat exchanger. Consequently the bled motive fuel flow is hot when conveyed through conduits of the fuel system. This hot motive fuel flow ejected from the ejector pump will melt any ice crystals formed in the fuel from the fuel tanks before delivery to the engine.

However, such hot motive flow fuel systems are not suitable for use in composite airframes, which are made of resin and carbon fiber for example, because the hot fuel temperature in the fuel system conduits passing through the composite airframe may expose the composite material to temperatures that exceed the recommended temperature limits of the material. Simply insulating the hot fuel system conduits is not practical for a number of reasons, including but not limited to the resulting weight penalty.

SUMMARY

There is provided a fuel system for a composite aircraft, the system comprising: a fuel storage tank; an ejector pump having a vacuum inlet in communication with the fuel storage tank; an engine feed pump having an inlet in fluid communication with an outlet of the ejector pump, a primary outlet in communication with an engine, and a motive flow outlet in fluid communication with an inlet of the ejector pump, the motive flow outlet being upstream of a oil-fuel heat exchanger; and a motive flow pump assembly disposed between the motive flow outlet of the engine feed pump and the inlet of the ejector pump, the motive flow pump assembly comprising an inlet screen and a motive flow pump, the inlet screen having a plurality of openings therein and a hydrophobic upstream surface, the plurality of openings being of dimensions to prevent passage of particles greater than a selected threshold size and to allow passage of liquids through the openings.

There is also provided a motive flow pump assembly for a fuel system of a composite aircraft, the motive flow pump assembly comprising an inlet screen and a motive flow pump in serial flow communication, the inlet screen defining a plurality of openings therein dimensioned to prevent passage of particles greater than a selected threshold size and to allow passage of liquids therethrough, and the inlet screen having a hydrophobic upstream surface.

There is further provided a method of pumping fuel in a fuel system of a composite aircraft having a gas turbine engine, the method comprising: feeding un-heated fuel from a fuel tank to the gas turbine engine, including using an ejector pump to draw the fuel from the fuel tank and feeding the fuel through an engine fuel pump and a heat exchanger in series within a main fuel line upstream of the gas turbine engine; bleeding fuel from the main fuel line upstream of the heat exchanger and directing the bleed fuel flow to the ejector pump via a motive flow pump assembly, the motive flow pump assembly including a motive flow pump generating a motive flow for the ejector pump; and passing the bleed fuel flow through a hydrophobic fuel screen located upstream of the motive flow pump, the hydrophobic fuel screen having a plurality of fluid flow openings of dimensions to prevent passage of particles greater than a selected threshold size and to allow passage of liquids through the openings.

The method of method of pumping fuel as described above may further include feeding the motive flow generated by the motive flow pump through an outlet fuel screen disposed downstream of the motive flow pump and upstream of the ejector pump.

The method of method of pumping fuel as described above may further include providing the outlet fuel screen with a hydrophobic material coating.

The method of method of pumping fuel as described above may further include providing the outlet fuel screen with fluid flow openings therein having a size that is greater than or equal to the fluid flow openings in the hydrophobic fuel screen.

The method of method of pumping fuel as described above may further include passing the bled fuel flow through a first coarse upstream screen having openings of dimensions greater than openings in a second finer downstream screen.

There is alternately provided a method of forming a motive flow pump assembly for a fuel system of a gas turbine engine, the method comprising: providing a fuel screen having a screen surface defining therein a plurality of fluid flow openings having a predetermined opening size, the predetermined opening size of the fluid flow openings being dimensioned to preventing passage of non-fluid particles greater than a selected threshold size and allow passage of fluid therethrough; providing the screen surface of the fuel screen with a hydrophobic material coating without obstructing said fluid flow openings, the hydrophobic surface preventing ice build up on the fuel screen; and positioning the fuel screen upstream from an inlet of a high pressure motive flow pump of the motive flow pump assembly.

The method of forming a motive flow pump assembly as described above may further comprises applying the hydrophobic material coating on the screen surface, the hydrophobic material coating including polytetraflouroethylene (PTFE).

BRIEF DESCRIPTION OF THE DRAWINGS

Reference is now made to the accompanying figures in which:

FIG. 2 is a schematic diagram of the fuel system which provides fuel flow to the gas turbine engine of FIG. 1;

FIG. 3 is a perspective view of one embodiment of the fuel screen of the motive flow fuel system of FIG. 2; and FIG. 4 is a cross-sectional view of an alternate embodiment of the fuel screen of the motive flow fuel system of FIG. 2.

DETAILED DESCRIPTION

Figure 1:
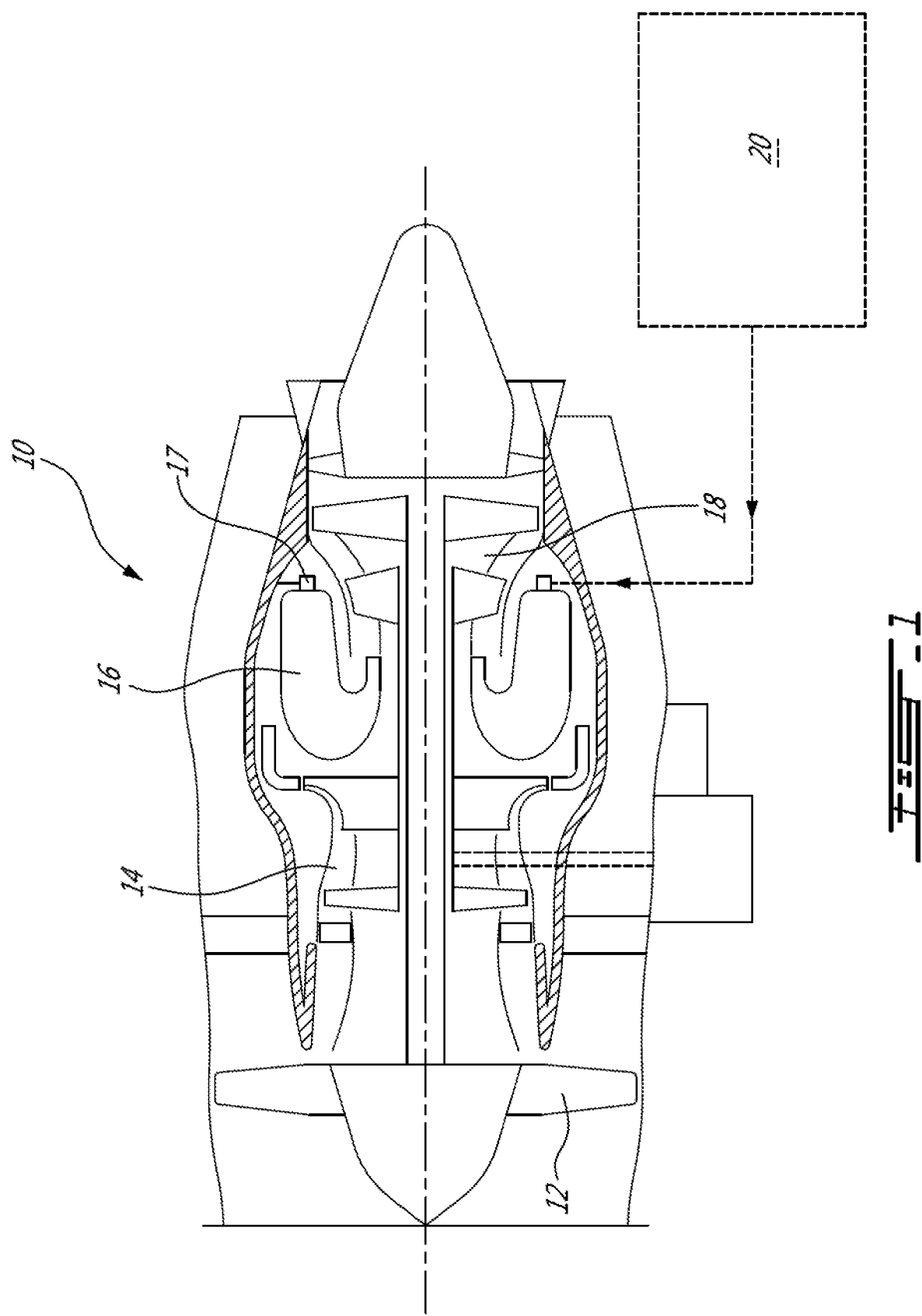
FIG. 1 is a schematic cross-sectional view of a gas turbine engine and a fuel system therefor.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. Fuel nozzles 17 receive the fuel from the fuel system 20 and inject the fuel into the combustor 16. Although a turbofan engine is depicted, it will be understood however that the fuel system as described herein may be used in conjunction with other types of gas turbine engines, such as turbo-shaft, turbo-prop and/or auxiliary power units.

Referring now to FIG. 2, the fuel system 20 in accordance with the present disclosure feeds fuel from one or more fuel tanks 2 of the aircraft airframe to the combustor 16 of the gas turbine engine 10 via the fuel nozzles 17. The fuel system 20 as described herein is a motive flow fuel system, and more particularly a cold motive flow fuel system adapted for use in an aircraft having components of the airframe made of composite material.

Hot motive fuel systems are typically less suitable for use in composite airframes, made of resin and carbon fiber for example, because the hot fuel temperature in conduits passing through the composite airframe may exceed the composite material capabilities and risk degrading the airframe structure. A cold motive fuel system such as that described herein is therefore more preferably used in composite airframes, whereby the pressurized motive fuel is bled upstream of the fuel/oil heat exchanger and downstream from a low pressure mechanical fuel pump. "Cold" fuel, as used herein, is understood to mean fuel that is un-heated, such as by a fuel exchanger (e.g. an oil-fuel exchanger, or otherwise).

The term "high pressure" as used herein, with reference to fuel and/or fuel pumps, refers to a fuel pressure corresponding to that generated at the output of a mechanical fuel pump which may be driven, for example, by the rotational output of the gas turbine engine. For example, the high pressure (HP) pump 26 as will be described further below (which feeds and/or is within the engine fuel control unit 47) may be a positive displacement pump, such as a gear type pump, capable of delivering fuel pressure of at least 1000 psi, and in another embodiment up to and/or greater than 1200 psi. A relief valve may be provided in the system to limit system pressure and prevent over-pressurization, and this relief valve may be set in the order of 1200 psi to protect the system. The "high pressure" generated by the HP fuel pump 26 may be more typically between about 100 psi (e.g. at engine idle) and up to about 1000 psi (e.g. aircraft take-off engine power). In a specific embodiment of the present system, the HP fuel pump 26 produces fuel pressure between about 100 psi (at engine idle) and about 400 psi (at aircraft take-off engine power). Pressures within all of these ranges are understood to be "high pressure", as used herein. However, it is to be understood that the exact operating pressures of the HP pump 26, which is the main feed pump for the gas turbine engine 10, will depend on aircraft requirements and operating conditions.

The term "low pressure" as used herein, with reference to fuel and/or fuel pumps, refers to a fuel pressure that is generally less than the above-defined "high pressure" ranges, although it is to be understood that a certain amount of overlap may exist. For example, low pressure fuel pumps/flow as described herein may provide fuel pressures of less than about 150 psi. In one particular embodiment, for example, the low pressure fuel may have a pressure of between about 30 psi (at engine idle) and about 130 psi (at aircraft take-off engine power). The low pressure (LP) pump(s) as described herein may for example be centrifugal pumps, such as an impeller type pump, wherein pressure rise is proportional to the square of the rotation speed of the pump. Such impeller pumps can provide fuel pressures within these low pressure fuel ranges.

The cold motive flow fuel system 20 of the present disclosure, when in operation, bleeds off a portion of the cold low pressure fuel from the main fuel line 19, at a location downstream of an engine feed pump 37 but upstream of an oil/fuel heat exchanger 25, to serve as motive fuel flow. This bleed flow is therefore cold fuel. The main fuel flow (i.e. that which is not bled off) is conveyed through the main fuel line 19 to high pressure pump 26, before being fed to the gas turbine engine 10.

More specifically, the engine feed pump 37 includes an inlet 36 in fluid communication with an outlet 38 of the ejector pump 21 via a bleed return conduit 28, and two outlets 39 and 49. Alternately, the engine feed pump may having only a single outlet, however the flow from which is then split into two separate downstream flows. The two outlets of the engine feed pump 37 include a primary outlet 39 and a motive flow outlet 49. The primary outlet 39 of the engine feed pump 37 is in fluid flow communication with the gas turbine engine 10, via the main fuel line 19. The motive flow outlet 49 of the engine feed pump 37 is in fluid communication with an inlet 22 of the injector pump 21, via a bleed conduit 29. The motive flow outlet 49 of the engine feed pump 37 is located upstream of the oil-fuel heat exchanger 25 in the main fuel line 19.

In operation of the fuel system 20, fuel is first ejected from a fuel tank 2 by an ejector pump 21 and into the bleed return conduit 28. The ejector pump 21, which may be either located directly within the fuel tank(s) 2 or downstream thereof, pumps the fuel out of the fuel tank(s) 2 using the motive flow 9. The motive flow 9, having a kinetic energy, draws or aspirates the fuel out and through the downstream bleed return fuel line 28 by venturi effect. Once the fuel is pumped out of the fuel tank 2, it goes through the engine feed pump 37, which may be a low pressure (LP) pump in an exemplary embodiment. The low pressure, engine feed pump 37 provides a relatively small increase in pressure to the fuel but displaces large volumes of fuel though the main fuel line 19 of the fuel system 20. The low pressure, engine feed pump 37 may be any pump that accomplishes the above and that may be sufficiently robust to cavitation, foreign object impact and usual wear.

More particularly, the motive flow fuel system 20 feeds fuel from the fuel tank(s) 2 of the airframe to the gas turbine engine(s) 10 with a motive flow of fuel produced, at least in part, by a motive flow ejector pump 21, which uses a high pressure flow of fuel, bled from the output of the mechanical low pressure, engine feed pump 37. The motive flow ejector pump 21 generates a suction which draws fuel out of the fuel tank(s) 2 via a vacuum inlet 27 in communication with the fuel storage tank 2. The ejector pump 21 draws fuel from the fuel storage tank 2 via negative pressure created when the nozzle 23 formed therein ejects a flow 9 of high pressure fuel into a flow restricting chamber 24 or venturi. This creates a negative pressure, or suction, which draws fuel from the fuel tank into the flow channel wherein it mixes with the high pressure motive flow. The combined flow exits the motive flow ejector pump 21 via bleed return conduit 28.

The major portion of the fuel flow which is not bled off via bleed conduit 29 continues through the main fuel line 19 to the oil/fuel heat exchanger 25 and a high pressure pump 26. A fuel filter 30 may also be provided in line, upstream of the high pressure pump 26. The output from the high pressure pump 26 is then directed through the main fuel flow conduit 19 to an engine fuel control and/or fuel metering unit 47 and fuel nozzles 17 of the gas turbine engine 10.

The minor portion of the fuel flow that is bled off via the bleed conduit 29, is conveyed through a motive flow pump assembly 32 prior to reaching the nozzle 23 at the inlet of the motive flow ejector pump 21. The motive flow pump assembly 32 creates the high pressure flow required for the ejector pump 21. The motive flow pump assembly 32 includes, in serial flow communication, an inlet screen 33, a motive flow pump 34 and an outlet screen 35.

The screens 33 and 35 of the motive flow pump assembly 32 may have openings in the range of 70-500 microns, which is a size selected to trap solid contaminant particles and ice while allowing sufficient liquid fuel flow through. Because the fuel is bled off from the main fuel passage 19 upstream of the heat exchanger 25, the bleed fuel flow in the bleed conduit 29 can be very cold. While any ice crystals in the bleed fuel flow will be trapped by the upstream screen 33 during cold operating conditions, these ice particles have the potential to accumulate, bond together and bond to the screen surface. As the inlet screen 33 captures ice crystals of a size too large to pass through the screen openings, ice crystals can obstruct the openings and bond together, thereby blocking fuel flow. Flow restriction due to ice blocking has the potential to damage the motive flow pump 34, which could lead to cavitation damage to pump bearings.

Accordingly, the inlet screen 33 of the motive flow pump assembly 32 can address such ice blockage problems by having an upstream surface that is hydrophobic, so as to inhibit bonding by ice crystals and blockage of the openings through which fuel is intended to flow. This hydrophobic upstream surface may be achieved by applying a hydrophobic coating applied to a porous screen structure, for example. The term "upstream surface" as used in this context refers to an outermost surface of the inlet screen which is first contacted by incoming fuel flow. For example, the entire surface of the porous screen need not be hydrophobic, provided that at least the outermost, upstream surface of the screen, against which the fuel flow first impinges, provides hydrophobic properties. Thus the upstream surface of the inlet screen 33 may be coated with a hydrophobic material, but the remainder of the porous inlet screen may not.

In one possible embodiment, both the inlet screen 33 and the downstream outlet screen 35 of motive flow pump assembly 32 comprise such a hydrophobic upstream surface. However, it is possible that only the upstream inlet screen 33 comprises the hydrophobic material, as this upstream inlet screen 33 may be used to prevent or break-up any ice build-up in the incoming bleed flow.

While the inlet and outlet screens 33 and 35 may be identical (i.e. the outlet screen 35 may be constructed as per the inlet screen 33 which will be described in further detail below), it is alternately possible to use an outlet screen 35 that has different screening/filtering flow properties. For example, the outlet screen 35 may have fluid flow openings therein that have a size that is greater than or equal to the openings in the inlet screen. In this embodiment, the inlet screen 33 may be finer, or have smaller openings, than the outlet screen 35. Thus, the finer inlet screen 33 will reduce the likelihood that ice crystals will reach the downstream motive flow pump 34 such as to prevent damage to the pump. The coarser outlet screen 35 will prevent any larger ice crystals, which may not have been caught in the inlet screen 33, from reaching the ejector pump 21.

The inlet screen 33 includes at least an upstream surface that extends through the flow path of the screen 33 and that is either formed of, or coated with, a hydrophobic material. This upstream surface of the screen is porous and has a plurality of openings therein through which fuel can flow, however the openings are dimensioned to prevent passage of solid contaminant particles, such as ice, greater than a selected threshold size and to allow passage of liquids through the openings.

The hydrophobic material of the upstream surface of the inlet fuel screen 33 may in one possible embodiment include polytetraflouroethylene (PTFE), however other hydrophobic materials may alternately be used. These hydrophobic materials may be painted or vapour deposited on the metal screen 33. The permeable cylindrical walls of the inlet fuel screen 33 may be a perforated metal foil that has accurately sized laser drilled openings. Alternatively, the screen may be a woven wire mesh, where the wire mesh is woven from wire strands pre-coated with the hydrophobic material. The wire mesh or metal foil may be spray coated after weaving or drilling as well. The hydrophobic material may be a sheet or layer bonded to or deposited on the upstream surface of the inlet screen.

One embodiment of the inlet fuel screen 33 is shown in FIG. 3. In the embodiment of FIG. 3, the fuel screen 33 comprises a cylindrical basket 40 having an annular flange 48 at a first end thereof and a porous wall 42 extending away from the annular flange to a remote second end 58. The annular flange 48 defines a central opening 46 therein. The porous wall is tubular and defines therein an interior chamber 44. The porous wall 42 may be formed from a perforated metal foil, for example. Fuel may enter the interior chamber 44 of the fuel screen 33 via the central opening 46 and exit through the plurality of openings 45 in the porous wall, in the porous wall 42, or vice versa. When fuel enters the cylindrical basket 40 via the large central opening 46, the radially inner surface 43 of the porous wall 42 represents the upstream surface that is hydrophobic. Conversely, if fuel enters the cylindrical basket 40 via the pores 45 in the porous wall 42, the radially outer surface 41 of the porous wall 42 constitutes the hydrophobic upstream surface, as defined above. In either case, at least the upstream surface of the porous wall 42 of the fuel screen 33 is made to be hydrophobic, for example by having a hydrophobic PTFE coating applied thereto, which limits the build-up of ice particles on the fuel screen 33 as the cold bleed fuel flows therethrough. Of course, both the upstream and downstream surfaces (or inner and outer surfaces) of the porous wall 42 may be hydrophobic. The perforated metal foil forming the porous wall 42 may be laser drilled, and subsequently coated with the PTFE material. In an alternate embodiment, the porous wall 42 may be formed from a woven wire mesh, rather than the perforated metal foil. The wire mesh may, for example, be woven from individual wire strands that are pre-coated with the hydrophobic material (including, but not limited to, PTFE).

Referring to FIG. 4, a fuel screen 133 in accordance with an alternate embodiment similarly defines a cylindrical basket 140, as per the cylindrical basket 40 of the fuel screen 33 of FIG. 3, having a cylindrical porous wall 142 that extends substantially perpendicularly to the fuel flow therethrough and defines therewithin an interior chamber 144. However, the cylindrical porous wall 142 of the fuel screen 133 is composed of two separate screens walls 141 and 143 which are concentrically nested but radially spaced apart from each other. The screen walls include a first, radially outer, screen wall 141 and a second, radially inner, screen wall 143. While both first and second screen walls are necessary porous, such that fuel can flow therethrough, the first screen wall 141 may be coarser than the second screen wall 143. In other words, the pores or openings in the first, radially outer, screen wall 141 may be of a greater dimension (e.g. larger) than the pores or openings in the second, radially inner, screen wall 143. The coarse screen wall 141 and the fine screen wall 143 may each define radially outer and inner surfaces, which will define upstream and downstream surfaces, respectively, when fuel flow is directed through the fuel screen 133 in a direction from the outside of the cylindrical basket 140 into the inner chamber 144. At least the upstream, radially outer, surfaces of both the first screen wall 141 and the second screen wall 143 are hydrophobic. Although the fuel screen 133 having the dual screen walls 141 and 143 is depicted and described here as a single, coaxially nested, structure, in yet another alternate embodiment the two screens 141 and 143 may be separate components in serial flow arrangement.

The above description is meant to be exemplary only, and one skilled in the art will recognize that other changes may be made to the embodiments described without departing from the scope of the appended claims. Such modifications which fall within the scope of the claims will be apparent to those skilled in the art, in light of a review of this disclosure. While the preferred embodiments as presently contemplated by the inventors are described, it will be understood that the claimed invention in its broad aspect includes mechanical and functional equivalents of the elements described herein.

The invention claimed is:

1. A method of pumping fuel in a fuel system of a composite aircraft having a gas turbine engine, the method comprising:
   feeding un-heated fuel in the fuel system, including using an ejector pump to draw the fuel from a fuel tank and feeding the fuel through an engine fuel pump within a main fuel line upstream of the gas turbine engine;
   bleeding fuel from the main fuel line and directing the bleed fuel flow to the ejector pump via a motive flow pump assembly, the motive flow pump assembly including a motive flow pump generating a motive flow for the ejector pump; and
   passing the bleed fuel flow through a hydrophobic fuel screen located upstream of the motive flow pump, the hydrophobic fuel screen having a plurality of fluid flow openings of dimensions to prevent passage of particles greater than a selected threshold size and to allow passage of liquids through the openings.

2. The method of claim 1, further comprising feeding the motive flow generated by the motive flow pump through an outlet fuel screen disposed downstream of the motive flow pump and upstream of the ejector pump.

3. The method of claim 2, further comprising providing the outlet fuel screen with a hydrophobic coating.

4. The method of claim 3, further comprising providing the outlet fuel screen with a polytetraflouroethylene coating.

5. The method of claim 2, further comprising providing the outlet fuel screen with fluid flow openings therein having a size that is greater than or equal to the fluid flow openings in the hydrophobic fuel screen.

6. The method of claim 1, further comprising providing the hydrophobic fuel screen with a polytetraflouroethylene coating.

7. The method of claim 1, wherein the hydrophobic fuel screen includes a cylindrical basket defining an interior chamber, the method further comprising allowing the bleed fuel flow to pass from the interior chamber through a porous wall of the cylindrical basket.

8. The method of claim 1, further comprising feeding the un-heated fuel through a heat exchanger located in series with the engine fuel pump in the main fuel line.

9. The method of claim 8, further comprising bleeding the bleed fuel from the main fuel line upstream of the heat exchanger.

* * * * *